Patented Jan. 3, 1939

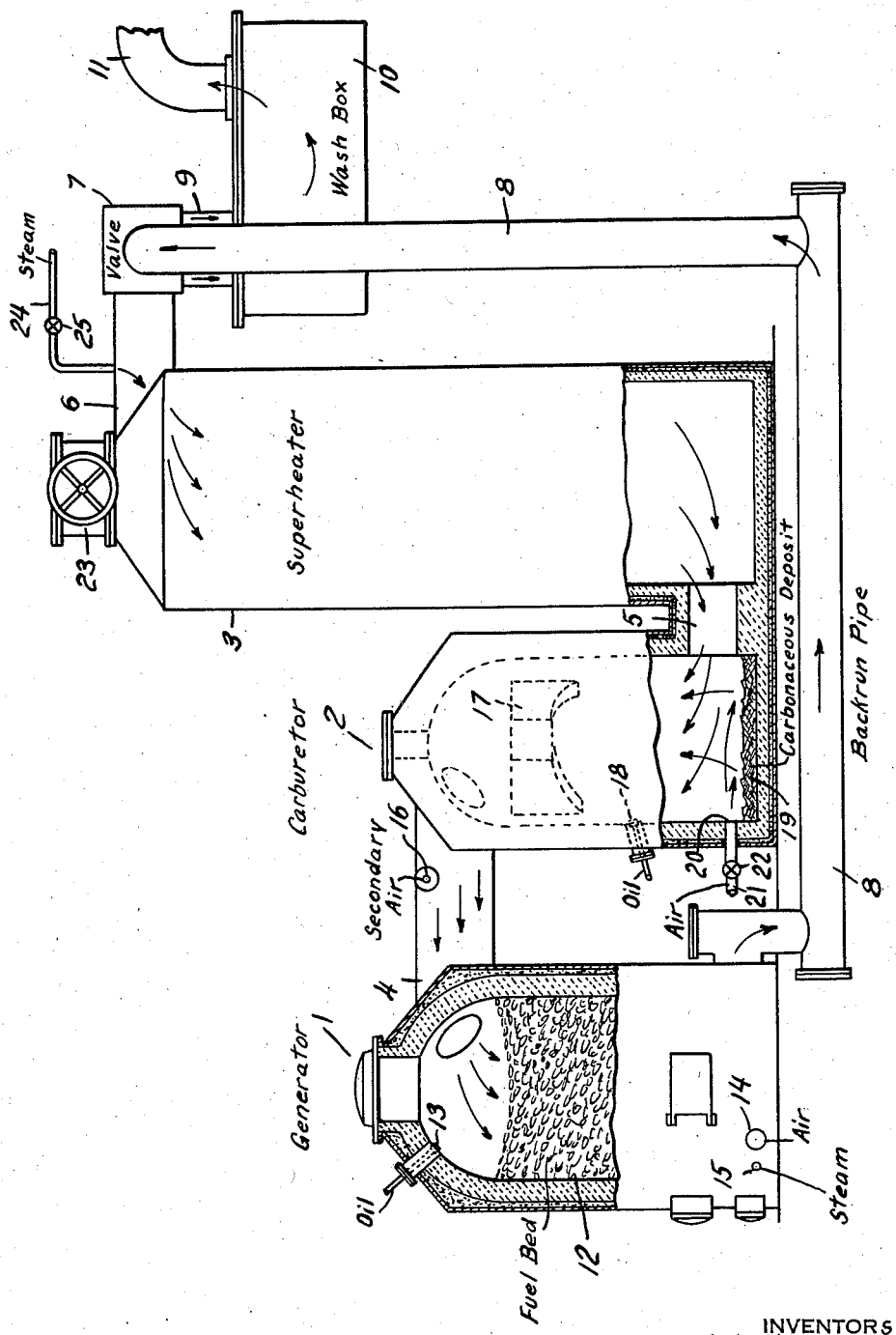

2,142,676

UNITED STATES PATENT OFFICE 2,142,676

PROCESS OF MAKING CARBURETED WATER GAS

Reginald P. Oliveros and Louis L. Newman, Brooklyn, N. Y., assignors to Semet-Solvay Engineering Corporation, New York, N. Y., a corporation of New York Application May 27, 1936, Serial No. 82,020

5 Claims. (Cl. 48—208)

This invention relates to carbureted water gas manufacture and, more particularly, to a "backrun" process of making carbureted water gas.

An object of the invention is to provide a process of making carbureted water gas which requires less fuel per unit volume of gas generated, than existing carbureted water gas processes. Other objects and features of the invention will be made evident as the description progresses.

A customary cycle of operation of a carbureted water gas set having a generator, carburetor and superheater connected in series, which cycle includes a backrun step, may be briefly outlined as follows as to the three principal steps, each step lasting about one-third of the cycle which normally takes in the neighborhood of five minutes.

(a) *Air blasting.*—The hot bed of carbonaceous fuel in the generator is blasted to incandescence with air or other oxygen-containing gas. The resulting hot blast gases are conducted from the generator, mixed with secondary air, and passed through the carburetor where the combustible constituents are burned. The resulting gas mixture is then conducted from the carburetor to the superheater and passed therethrough, thus heating the refractory material therein.

(b) *Uprun step.*—The fuel bed having reached the desired temperature, the air blasting is discontinued and steam is passed through the fuel bed to produce water gas. Normally, an uprun step is employed, the steam being passed up through the fuel bed in the generator and the resulting water gas is then conducted to and down through the carburetor. In passing through the carburetor, the water gas is carbureted by being contacted with an enriching oil. The decomposition of the oil generally results in the formation of carbonaceous deposits in the carburetor, the amount depending on the kind and quantity of oil used. The resulting carbureted water gas is then passed up through the superheater where the gas is fixed.

(c) *Backrun step.*—After a suitable interval the forward run of steam and introduction of oil into the carburetor are discontinued, and a backrun step employed. During this step, steam is passed in a backward stream through the superheater, through the carburetor, and then through the fuel bed of the generator which is still at a water gas making temperature. In some cases the steam from the carburetor is passed down through the fuel bed of the generator while oil is sprayed on the fuel bed, resulting in the formation of carbureted water gas within the fuel bed, which is withdrawn from the base of the generator.

In a modification of the backrun step just described, steam is first passed in a backrun at less than the usual rate concurrently with spraying of oil on the fuel bed, and then the introduction of oil is discontinued and steam is passed in a backrun at about the usual or an increased rate. During the first portion of the step about 4–55% of the usual steam rate may be used, and during the second portion about 100–200%. For example, as compared with a normal backrun step involving the use of 140 pounds of steam per minute, at constant rate for two minutes, steam may be used at the rate of 60 pounds per minute for 63 seconds and then at the rate of 175 pounds per minute for 57 seconds. The total amount of steam employed in the whole step is preferably but not necessarily less than that employed when steam is backrun at a substantially constant rate. This modified form of backrun step is described in detail and claimed in the copending application of one of us, Reginald P. Oliveros, Serial No. 705,351, filed January 5, 1934, now Patent No. 2,047,518.

Various hydrocarbon oils may be used for enriching and carbureting the water gas passing through the carburetor during the forward or uprun step. Heavy oils, as for example, crude oils and Bunker C oils, produce substantial amounts of carbonaceous residue even when a gas of ordinary calorific content is being made (such as gas having 525–540 B. t. u. per cubic foot).

In making gas of high calorific content (such as 800–1000 B. t. u. per cubic foot), for admixture with natural gas or direct use, it has also been the experience that substantial amounts of carbonaceous residue are produced even when using lighter oils (such as gas oil) which do not produce such deposits when used in making ordinary gas, due to the greater than normal amount of oil which must be used in each cycle to produce high B. t. u. gas. For example, as compared with 2¾ to 3 gallons of gas oil used in making 1000 cu. ft. of 525–540 B. t. u. gas, 8¾ to 9 gallons of gas oil are needed in making 800 B. t. u. gas and 11 to 12 gallons of gas oil in making 1000 B. t. u. gas.

In accordance with our invention such carbonaceous deposits formed in the carburetor are burned during the backrun step and the products of combustion with admixed steam are passed into and through the fuel bed to supply heat to the steam and the fuel bed, whereby less coke or other fuel is consumed in the fuel bed in the generator per unit of gas produced in a complete cycle and a saving of fuel is effected.

Air or other oxygen-containing gas is introduced into the carburetor, during all or part of the backrun step, in direct contact with the carbonaceous residue to produce combustion thereof. The hot combustion gases are passed with the steam from the superheater back to and through the generator, resulting in additional superheating of the steam and the reheating to a certain extent of the fuel bed. Thus more steam can be converted to water gas and more oil vaporized and cracked or reformed to enrich the same, in the generator, before the temperature of the fuel bed is reduced (as a result of the endothermic water gas making and carbureting reactions) to the usual cut off temperature, than would otherwise be the case.

At the same time the carbonaceous residue initially present in the carburetor following the preceding step is largely or wholly consumed during each backrun step of a cycle of operation, thus preventing or minimizing the building up of deposits which would otherwise become troublesome and require frequent cleaning out either mechanically or otherwise.

We have found that when the previously described modified form of backrun step is employed that it is advantageous to confine the introduction of air for burning the carbonaceous deposits to a portion of the step subsequent to the first portion involving the passing of steam at reduced rate with concurrent introduction of oil onto the fuel bed of the generator. In other words, the hot products of combustion can be used to better advantage during the latter part of the backrun step, from the standpoint of overall efficiency.

We have also found it desirable to conduct the backrun step in three stages or portions when employing air to burn carbonaceous deposits in accordance with our invention. During the first portion (which may last about 44% of the whole step) steam at reduced rate is passed through the set with concurrent introduction of oil onto the fuel bed of the generator; during the next portion (which may last about 12%) steam at about the normal or at an increased rate is passed through the set and no oil is introduced; and during the last portion (which may last about 44%) steam is again passed through the set at a reduced rate without introducing oil onto the fuel bed of the generator, and is accomplished by introduction of air to the carburetor to burn the carbonaceous deposit.

For optimum results, it is desirable that the hot combustion gases resulting from the burning of the carbonaceous deposits be as hot as possible and not relatively cool as would result from using an amount of air substantially in excess of that required for producing combustion of the carbonaceous deposit in the carburetor. Hence, preferably, but not necessarily, the amount of air or other oxygen-containing gas introduced into the carburetor is regulated so as to cause the oxygen content of the gas to be largely consumed in supporting the combustion of the carbonaceous deposits.

The accompanying drawing shows a side elevation, partly in section, of a carbureted water gas set arranged for the practice of our invention, and illustrates a preferred method of carrying out the invention.

Referring to the drawing, there is shown a carbureted water gas set of well known type comprised of a generator 1, carburetor 2, and superheater 3, connected in series by pipe 4 which connects the top portions of the generator and carburetor, and crossover or pipe 5 which connects the bottom portions of the carburetor and superheater. The top of the superheater is connected by pipe 6 with three-way valve 7, and this valve is also connected to the bottom of the generator below the grate (not shown), by pipe line 8. Valve box 7 is joined by pipe 9 to wash-box 10, and the latter is provided with gas offtake 11. Valve 7 permits gas to be passed to the wash-box and offtake from either the top of the superheater 3 or the bottom of the generator 1, as required during different steps of a cycle of operation of the set.

The generator is provided with the customary grate (not shown) which supports the fuel bed 12 of coke or coal. At the top of the generator, preferably disposed in the side remote from the outlet to pipe 4, there is provided oil inlet 13 to permit spraying of oil on the fuel bed. At the base of the generator and below the grate, inlets are provided for blast air and uprun-steam as illustrated by inlets 14 and 15, respectively. An inlet 16 for secondary air is provided in pipe 4 which connects the tops of the generator and carburetor.

The carburetor is of the improved ignition arch type disclosed and claimed in the application of Charles H. Hughes, Serial No. 542,271, filed June 5, 1931, now Patent No. 2,064,006 issued December 15, 1936. Briefly stated, the carburetor, instead of being provided with the usual checkerbrick interior, is provided with a refractory arch 17, formed of two arches intersecting at right angles, which bonds with the refractory lining of the carburetor and is disposed in the upper portion thereof immediately below the inlet from pipe 4. Positioned beneath the arch is a set of circumferentially arranged water jacketed oil sprays, one of the sprays 18, being shown. These sprays are arranged so that a spray of oil can be directed upwardly toward the arch. The interior portion of the carburetor, below the arch, is unobstructed and forms a substantially empty chamber, permitting carbonaceous deposits formed in the carburetor to fall to the floor thereof, forming carbonaceous deposit 19.

At the base of the carburetor there is provided a set of circumferentially arranged air inlets to permit introduction of air in accordance with our invention. Air inlet 20 is shown with its supply pipe 21 and control valve 22.

The top of the superheater is provided with blast valve 23. Provision is made for introducing backrun steam to the top of the superheater through steam pipe 24, controlled by valve 25, which leads into pipe 6.

The arrows within the apparatus show the direction of flow of gases during a backrun when air is introduced to burn the carbonaceous deposit in the carburetor.

Mention of various conventional apparatus details, not necessary to an understanding of the gas making process and our invention, has not been made, as these details are well known to those skilled in the art.

An illustrative cycle of operation of a set using heavy oil in accordance with our invention, includes the following principal steps and substeps. The percentage figures given at the beginning of each description indicate the period of time involved relative to the whole cycle.

(a) 20%.—Following the last gas making step, the fuel bed is at relatively low temperature, and blast air is introduced into the generator 1 through inlet 14 and passes up through the fuel bed until the latter is brought to an incandescent state. The resultant blast gases pass from the top of the generator through pipe 4 where they are admixed with secondary air admitted through inlet 16, and the mixture is ignited in the carburetor upon contacting ignition arch 17 and burned while passing through the carburetor 2 and superheater 3, thus heating these chambers. The products of combustion leave the top of the superheater through blast valve 23.

(b) 30%.—At the completion of the blasting step, which may be of approximately eighty seconds duration, an up run gas making step is performed, steam being introduced at the rate of about 75 lbs. per minute into the base of the generator through inlet 15 and passing up through the fuel bed where water gas is generated. Oil is sprayed in from inlet 13 at the top of the generator and the oil vapors become admixed with the water gas. The water gas and oil vapor mixture passes down through the carburetor where it is enriched by oil sprayed through inlets 18 countercurrently to the descending water gas, and the oil vaporized and cracked or reformed. About 35 gallons of heavy oil are introduced into the generator and about 15 gallons of heavy oil into the carburetor during the step. Carbonaceous material resulting from decomposition of the oil, and which will be formed in substantial amounts as heretofore explained, will settle to the bottom of the carburetor and form carbonaceous deposit 19 on the floor. The carbureted water gas then passes up through the superheater, where it is fixed, to the wash box through valve 7, and is taken off through outlet 11.

(c) 20%.—A backrun step is then performed, divided into three portions or periods. During the first portion steam is passed at less than the normal rate as previously explained, and amounting to about 30 lbs. per minute, from steam pipe 24 back through the set and down through the fuel bed of the generator upon which oil is concurrently sprayed, about 30 gallons of heavy oil being used. The carbureted water gas formed within the fuel bed is passed through backrun pipe 8 to valve 7 and thence through wash box 10 to outlet 11.

(d) 5%.—During the second portion of the backrun step, steam at the rate of about 125 lbs. per minute is passed back through the set in the same way, but without spraying of oil on the fuel bed, the resultant water gas being discharged through outlet 11.

(e) 20%.—During the third portion of the backrun, steam is again passed back at reduced rate (about 30 lbs. per minute) as in the first portion, but no oil is sprayed on the fuel bed. During this portion of the step, air is blown into the base of the carburetor through the air inlets 20, and passes into direct contact with the carbonaceous deposit 19. Combustion of the carbonaceous material takes place and the hot products of combustion pass upwardly through the carburetor in admixture with the backrun steam which enters from the superheater at the base of the carburetor. The steam is thus additionally superheated and additional heat is supplied to the fuel bed in the generator when the gaseous mixture passes down therethrough. Preferably the amount of air introduced during this portion of the step is sufficient to produce combustion of substantially the entire carbonaceous deposit, but is not greatly in excess of the amount so required. The amount of air to be used in a given case can easily be determined by trial and will vary with the circumstances.

(f) 5%.—Lastly, steam is introduced into the base of the generator, through inlet 15, in a short uprun purging step to remove gases from the base of the generator. The next cycle then begins, commencing with air blasting.

In making high B. t. u. gas, i. e., gas having a B. t. u. of from 800 to 1000 or greater, substantially the above cycle of steps may be employed, gas oil or other refined oil being introduced onto the fuel bed in the generator and into the carburetor during the uprun. The amount of gas oil thus introduced may be of the order of from 8 to 12 gallons per 1000 cu. ft. of gas made depending on the desired B. t. u. of the gas. A backrun of steam may follow the uprun during which no oil is added to the fuel bed and air is introduced into the carburetor to support combustion of the carbonaceous deposits formed during the uprun. The backrun step may involve the passage of steam at a uniform rate through the fuel bed and not as described above, the division of the backrun step into two or three portions with different rates of steam flow during the portions of the step, and oil addition to the generator during the flow of steam at reduced or low rates of flow through the fuel bed. In some cases in making high B. t. u. gas in order to obtain gas of desired gravity, it may be found desirable to add gas oil to the generator fuel bed during the backrun, in which cases a divided backrun step may be employed, i. e., steam at different rates may be passed through the fuel bed during the backrun and the oil added while the steam at reduced rate is passed through the fuel bed.

In the claims, it will be understood that the term "air" is used for the sake of convenience and includes oxygen or any oxygen-containing gas suitable for supporting combustion of carbonaceous material.

Having described our invention, but without any intent to be limited by the description, since the invention is obviously capable of various modifications and embodiments, what we claim is as follows:

1. A method of operating a carbureted water gas set including a generator having a fuel bed therein, a carburetor having the lower portion substantially open and unobstructed to permit settling of carbonaceous material produced in the carburetor, and a superheater, connected in series so that the top of the generator communicates with the top of the carburetor and the bottom of the latter communicates with the bottom of the superheater; comprising blasting the fuel bed to incandescence with an upward stream of air and employing the resultant blast gases in heating the carburetor and superheater; passing an uprun of steam through the fuel bed and carbureting the resultant water gas by passing downwardly through the carburetor while spraying oil therein so as to vaporize and partially crack the oil and form carbonaceous material resulting in a substantial bed of carbonaceous material extending across the bottom of the carburetor, passing the carbureted water gas up through the superheater to fix the same; and passing steam in reverse direction back through the superheater, carburetor and generator while during at least a portion of this steam flow introducing air into the lower portion of the carburetor and into direct contact with said carbonaceous deposit to produce combustion thereof, the resulting hot combustion products passing upwardly in the carburetor in admixture with the steam and serving to supply heat to the steam and to the fuel bed, the steam being converted to water gas in passing down through the fuel bed.

2. A method of operating a carbureted water gas set including a generator having a fuel bed therein, a carburetor having an ignition arch in the upper portion and having the lower portion substantially open and unobstructed to permit settling of carbonaceous material produced in the carburetor, and a superheater, connected in series so that the top of the generator communicates with the top of the carburetor and the bottom of the latter communicates with the bottom of the superheater; comprising blasting the fuel bed to incandescence with an upward stream of air and employing the resultant blast gases in heating the carburetor and superheater; passing an uprun of steam through the fuel bed and carbureting the resultant water gas by passing downwardly through the carburetor while spraying oil upwardly and countercurrently therein so as to vaporize and partially crack the oil and form carbonaceous material resulting in a substantial deposit of carbonaceous material in the bottom of the carburetor, passing the carbureted water gas up through the superheater to fix the same; and passing steam in reverse direction back through the superheater, carburetor and generator while during at least a portion of this steam flow introducing air into the lower portion of the carburetor and into direct contact with said carbonaceous deposit to produce combustion thereof, the resulting hot combustion products passing upwardly in the carburetor in admixture with the steam and serving to supply heat to the steam and to the fuel bed, the steam being converted to water gas in passing down through the fuel bed.

3. A method according to the preceding claim in which the steam is passed in reverse direction back through the set in three successive portions, the first being passed back at substantially less than the customary rate employed when a constant rate is used, with concurrent spraying of oil on the fuel bed, the second being passed back at substantially the same or greater rate than customary but without introduction of oil on the fuel bed, and the third being back at less than the customary rate while introducing the air into the carburetor substantially as described.

4. A method of operating a carbureted water gas set including a generator having a fuel bed therein, a carburetor having an ignition arch in the upper portion and having the lower portion substantially open and unobstructed to permit settling of carbonaceous material produced in the carburetor, and a superheater, connected in series so that the top of the generator communicates with the top of the carburetor and the bottom of the latter communicates with the bottom of the superheater; comprising blasting the fuel bed to incandescence with an upward stream of air and employing the resultant blast gases in heating the carburetor and superheater; passing an uprun of steam through the fuel bed and carbureting the resultant water gas by spraying oil into the generator above the fuel bed and passing the resulting mixture of water gas and oil downwardly through the carburetor while spraying oil upwardly and countercurrently therein, thus vaporizing and partially cracking the oil and producing carbonaceous material resulting in a substantial deposit of the latter in the bottom of the carburetor, passing the carbureted water gas up through the superheater to fix the same; passing steam in reverse direction back through the superheater, carburetor and generator in three portions, the first at substantially less than the customary rate employed when a constant rate is used, with concurrent spraying of oil on the fuel bed, the second at substantially the same or greater rate than customary but without introduction of oil on the fuel bed and the third at less than the customary rate while concurrently introducing air to the bottom of the carburetor to produce substantially complete combustion of the carbonaceous deposit therein, the amount of air used being not greatly in excess of that required for this purpose, the products of combustion passing upwardly through the carburetor in admixture with the steam and the mixture then passing downwardly through the fuel bed in the generator.

5. A process of making carbureted water gas in a set having a generator containing a bed of carbonaceous fuel and a carburetor having an unobstructed portion, connected with the generator, which includes the steps of air blasting the fuel bed and heating the carburetor by burning the resultant blast gases therein, passing steam into the hot fuel bed and carbureting the resultant water gas in said carburetor, thereby forming a carbonaceous residue which settles through said unobstructed portion and forms a bed of carbonaceous material of substantial depth extending across said unobstructed portion of said carburetor, passing a reverse run of steam through the carburetor and the fuel bed of the generator and, during said reverse steam run, introducing a blast of air into direct contact with the carbonaceous bed in said carburetor to produce combustion of said bed, the resulting hot products of combustion admixing with the steam and passing therewith through the fuel bed of the generator.

REGINALD P. OLIVEROS.
LOUIS L. NEWMAN.